(12) United States Patent
Weinberg et al.

(10) Patent No.: US 9,239,604 B2
(45) Date of Patent: Jan. 19, 2016

(54) VIDEO PROCESSING DEVICE WITH RING OSCILLATOR FOR POWER ADJUSTMENT AND METHODS FOR USE THEREWITH

(71) Applicants: Yoav Weinberg, Thornhill (CA); Norman Vernon Douglas Stewart, Toronto (CA)

(72) Inventors: Yoav Weinberg, Thornhill (CA); Norman Vernon Douglas Stewart, Toronto (CA)

(73) Assignee: VIXS Systems, Inc., Toronto (CA)

( * ) Notice: Subject to any disclaimer, the term of this patent is extended or adjusted under 35 U.S.C. 154(b) by 326 days.

(21) Appl. No.: 13/741,632

(22) Filed: Jan. 15, 2013

(65) Prior Publication Data

US 2014/0063349 A1 Mar. 6, 2014

Related U.S. Application Data

(60) Provisional application No. 61/695,671, filed on Aug. 31, 2012.

(51) Int. Cl.

| | | |
|---|---|---|
| *G06F 1/32* | (2006.01) | |
| *H04N 5/14* | (2006.01) | |
| *H04N 19/127* | (2014.01) | |
| *H04N 19/156* | (2014.01) | |
| *H04N 19/61* | (2014.01) | |

(52) U.S. Cl.
CPC .. *G06F 1/32* (2013.01); *H04N 5/14* (2013.01); *H04N 19/127* (2014.11); *H04N 19/156* (2014.11); *H04N 19/61* (2014.11)

(58) Field of Classification Search
CPC .................................. G06F 1/32; G06F 1/3287
USPC ............................................... 713/3, 320, 324
See application file for complete search history.

(56) References Cited

U.S. PATENT DOCUMENTS

| | | | | |
|---|---|---|---|---|
| 7,483,322 | B2 * | 1/2009 | Joshi et al. ..................... | 365/201 |
| 8,072,275 | B1 * | 12/2011 | Paz .................................. | 331/57 |
| 8,923,073 | B2 * | 12/2014 | Brooks .................... | 365/189.011 |
| 2003/0206071 | A1 * | 11/2003 | Wong et al. .................... | 331/176 |
| 2004/0263265 | A1 * | 12/2004 | Allen et al. ..................... | 331/57 |
| 2006/0238267 | A1 * | 10/2006 | Bienek et al. ................. | 331/176 |
| 2008/0209285 | A1 * | 8/2008 | Acharyya et al. ............. | 714/724 |
| 2008/0282102 | A1 * | 11/2008 | Reddy et al. ................... | 713/323 |
| 2008/0307240 | A1 * | 12/2008 | Dahan et al. .................. | 713/320 |
| 2009/0289615 | A1 * | 11/2009 | Foley ............................. | 323/318 |
| 2010/0194442 | A1 * | 8/2010 | Walley .......................... | 327/100 |
| 2011/0245948 | A1 * | 10/2011 | Bai et al. .......................... | 700/97 |
| 2012/0005513 | A1 * | 1/2012 | Brock et al. ................... | 713/340 |
| 2013/0047166 | A1 * | 2/2013 | Penzes et al. ................. | 718/105 |

* cited by examiner

*Primary Examiner* — Chun Cao
(74) *Attorney, Agent, or Firm* — Garlick & Markison; Bruce E. Stuckman

(57) ABSTRACT

A video processing device includes a substrate. A plurality of ring oscillators generate a corresponding plurality of ring oscillator outputs. A control circuit generates power adjustment signals for adjusting at least one power supply voltage of the video processing device, based on the plurality of oscillator outputs.

10 Claims, 13 Drawing Sheets

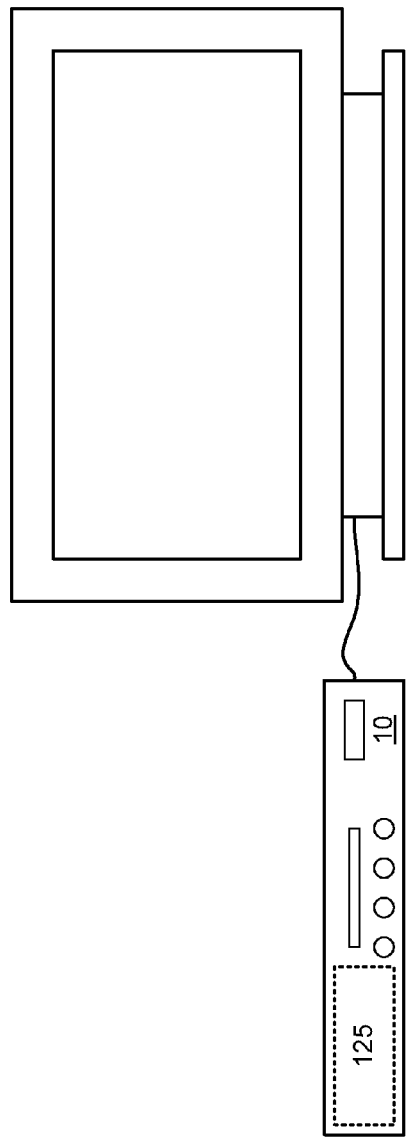
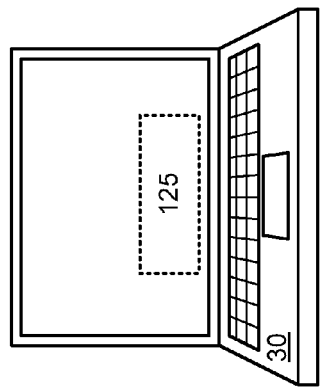
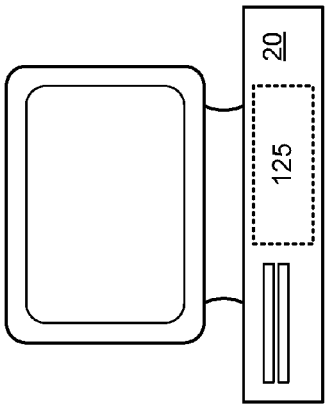

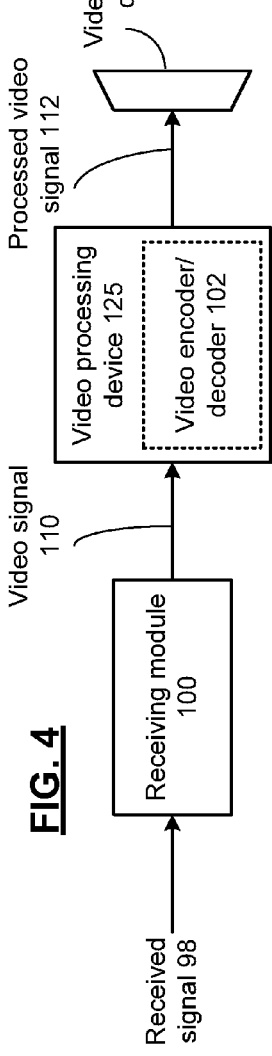
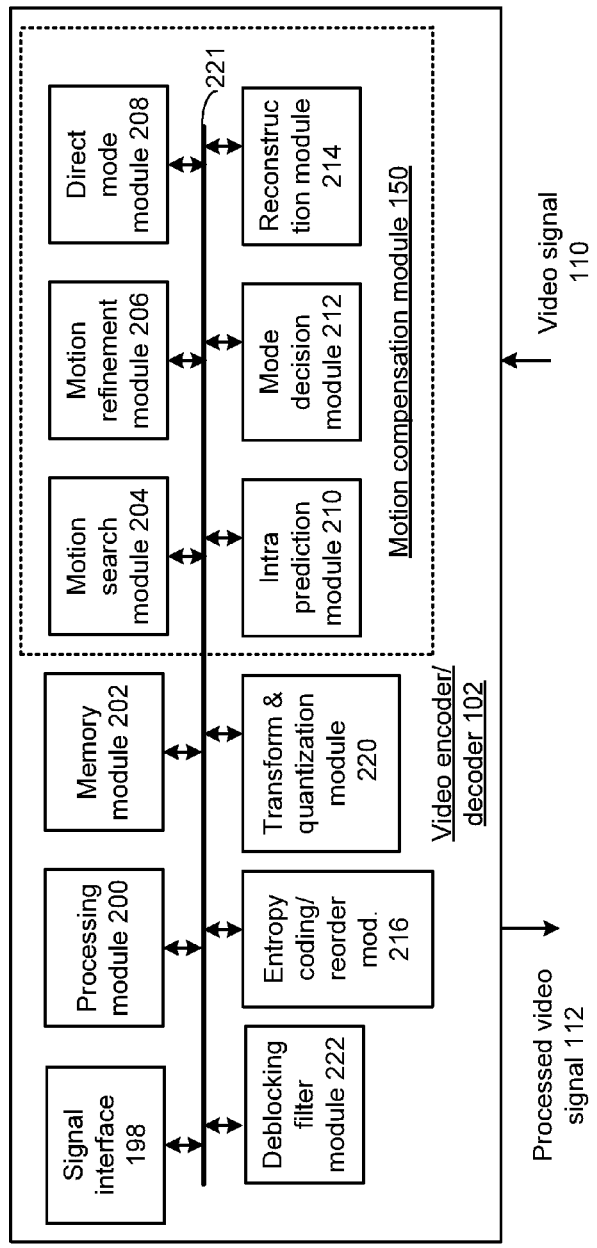

Video encoding operation

Video decoding operation

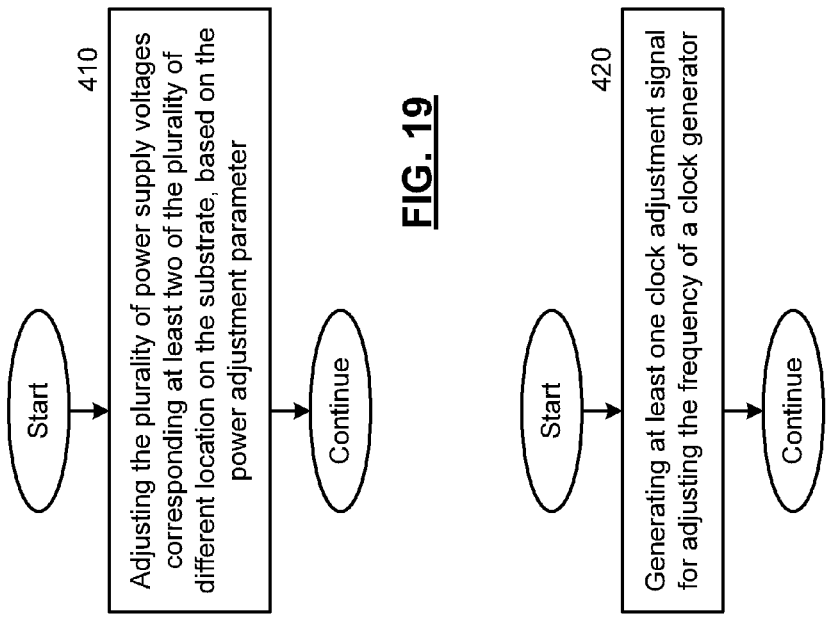
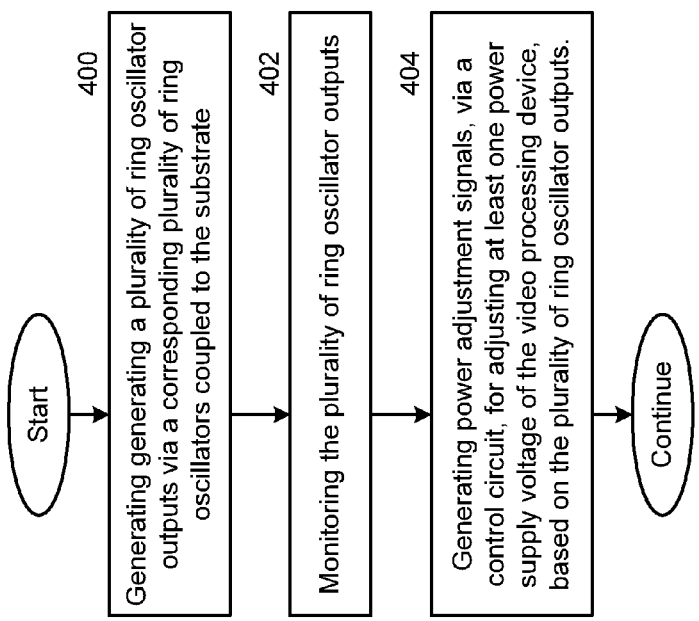

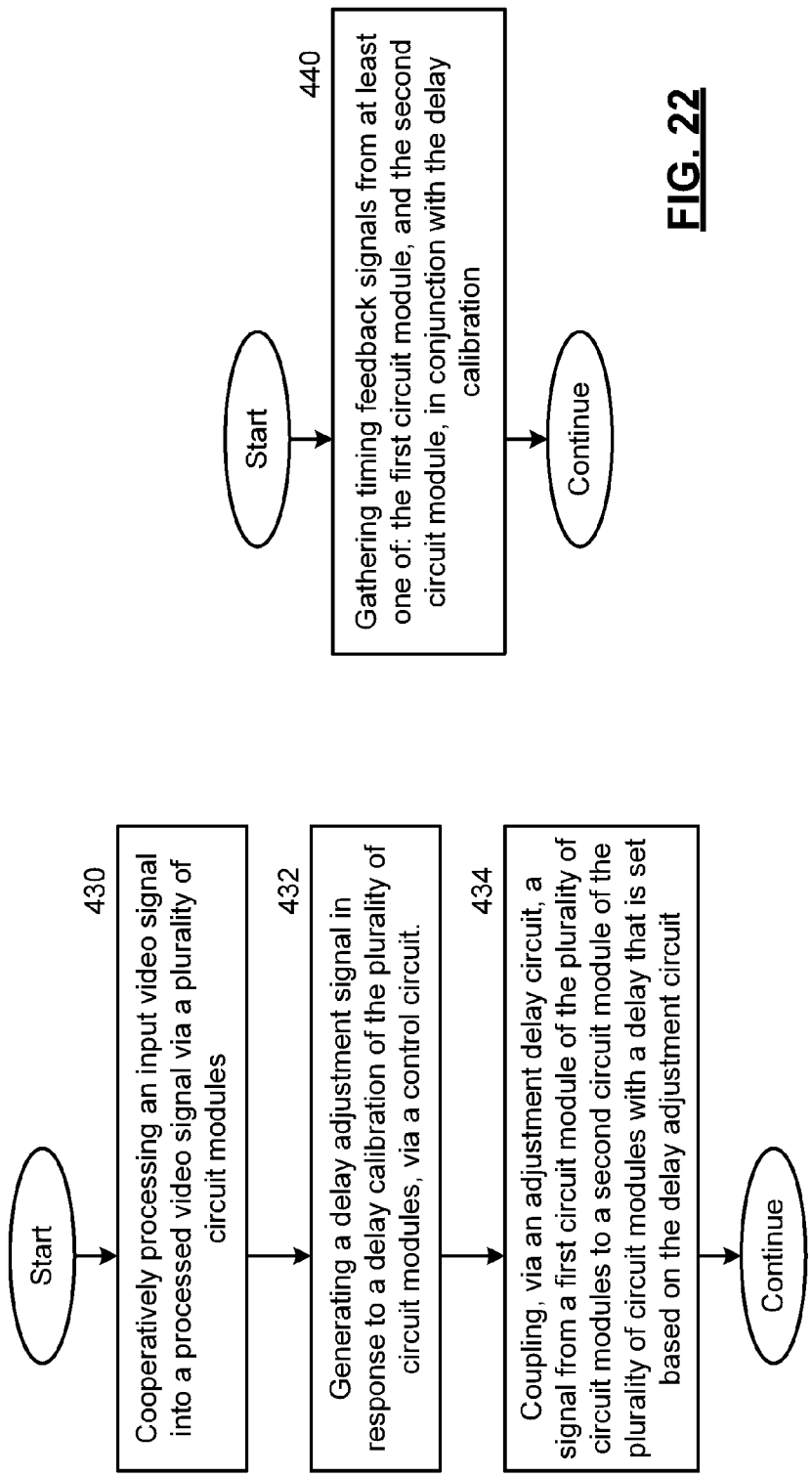

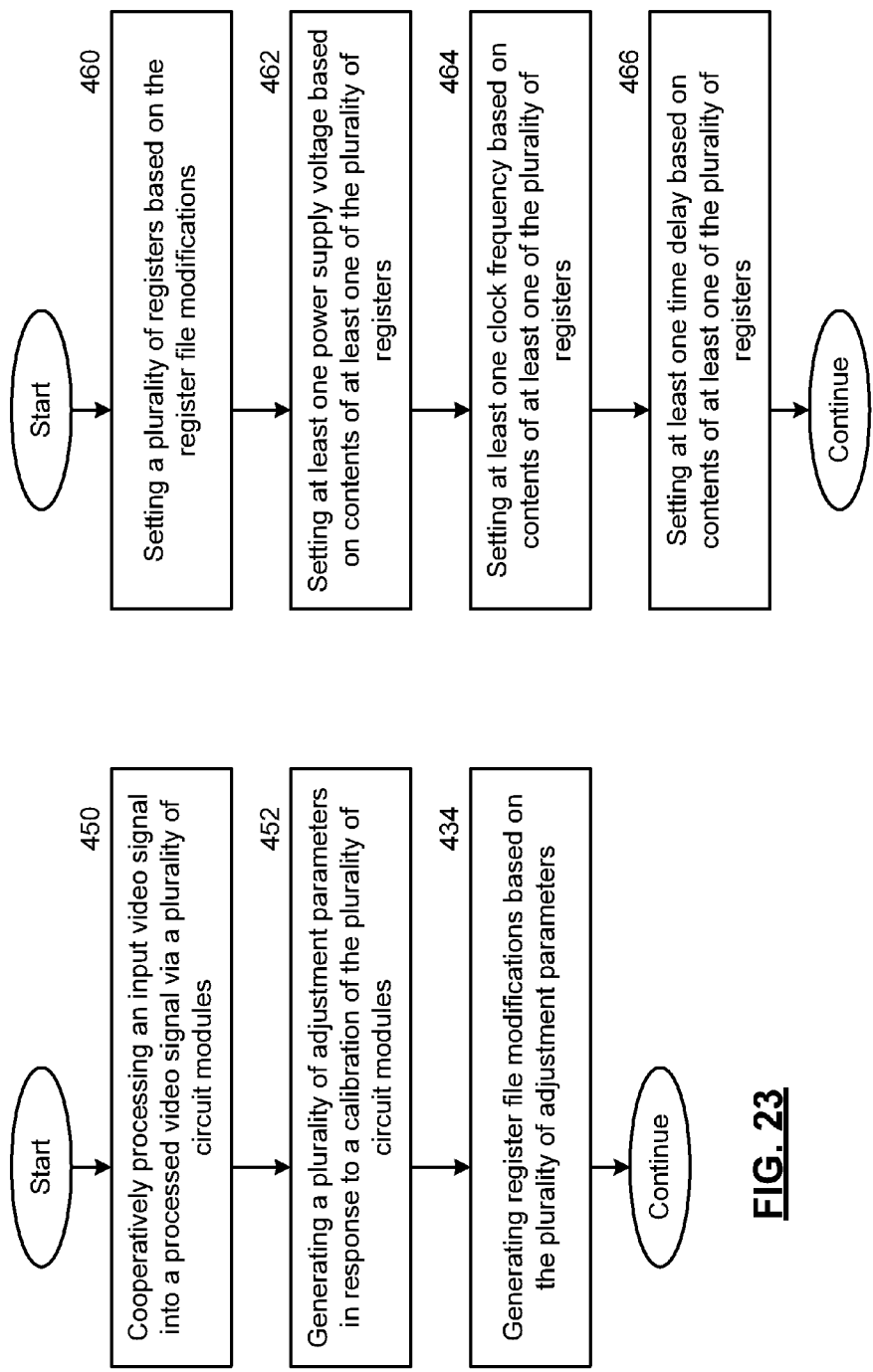

VIDEO PROCESSING DEVICE WITH RING OSCILLATOR FOR POWER ADJUSTMENT AND METHODS FOR USE THEREWITH

CROSS REFERENCE TO RELATED APPLICATIONS

The present application claims priority under 35 USC 119 to the provisionally filed U.S. application entitled, "VIDEO PROCESSING DEVICE WITH SELF-CALIBRATION AND METHODS FOR USE THEREWITH", having application Ser. No. 61/695,671, filed on Aug. 31, 2012, the contents of which are incorporated herein in their entirety by reference for any and all purposes.

TECHNICAL FIELD OF THE INVENTION

The present invention relates to video processing devices such as video encoders and decoders.

DESCRIPTION OF RELATED ART

Video encoding has become an important issue for modern video processing devices. Robust encoding algorithms allow video signals to be transmitted with reduced bandwidth and stored in less memory. Standards have been promulgated for many encoding methods including Motion Picture Experts Group (MPEG) format (such as MPEG1, MPEG2 or MPEG4), Quicktime format, Real Media format, Windows Media Video (WMV) or Audio Video Interleave (AVI) and the H.264 standard that is also referred to as MPEG-4, part 10 or Advanced Video Coding, (AVC). The compression of video signals generally comes at the cost of greater computational burden, particularly for high resolution video signals with high degrees of motion and scene complexity. Encoding and decoding devices need to operate efficiently and accurately in order to perform these tasks.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 1-3 present pictorial diagram representations of various devices in accordance with embodiments of the present invention.

FIG. 4 presents a block diagram representation of a video processing device 125 in accordance with an embodiment of the present invention.

FIG. 5 presents a block diagram representation of a video encoder/decoder 102 in accordance with an embodiment of the present invention.

FIG. 18 presents a flowchart representation of a method in accordance with an embodiment of the present invention.

FIG. 19 presents a flowchart representation of a method in accordance with an embodiment of the present invention.

FIG. 20 presents a flowchart representation of a method in accordance with an embodiment of the present invention.

FIG. 21 presents a flowchart representation of a method in accordance with an embodiment of the present invention.

FIG. 22 presents a flowchart representation of a method in accordance with an embodiment of the present invention.

FIG. 23 presents a flowchart representation of a method in accordance with an embodiment of the present invention.

FIG. 24 presents a flowchart representation of a method in accordance with an embodiment of the present invention.

Figure 6:
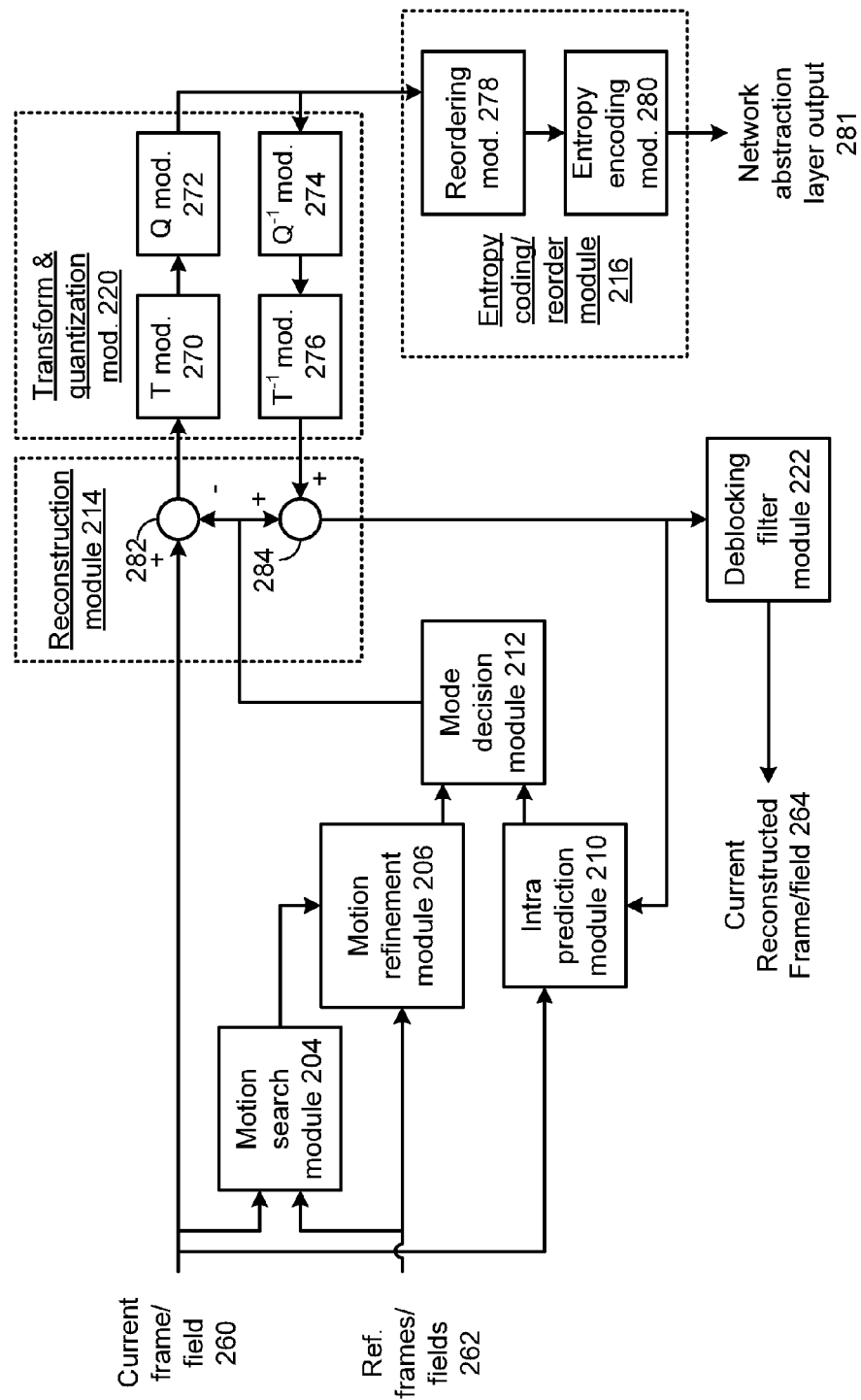
FIG. 6 presents a block flow diagram of a video encoding operation in accordance with an embodiment of the present invention.

DETAILED DESCRIPTION OF THE INVENTION INCLUDING THE PRESENTLY PREFERRED EMBODIMENTS

FIGS. 1-3 present pictorial diagram representations of a various video processing devices in accordance with embodiments of the present invention. In particular, set top box 10 with built-in digital video recorder functionality or a stand alone digital video recorder, computer 20 and portable computer 30 illustrate electronic devices that incorporate a video processing device 125 that includes one or more features or functions of the present invention. While these particular devices are illustrated, video processing device 125 includes any device that is capable of encoding, decoding or transcoding video content in accordance with the methods and systems described in conjunction with FIGS. 4-24 and the appended claims.

FIG. 4 presents a block diagram representation of a video processing device 125 in accordance with an embodiment of the present invention. In particular, video processing device 125 operates in conjunction with a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video encoder/decoder module 102 is coupled to the receiving module 100 to decode, re-encode and/or transcode the video signal 110 to create processed video signal 112 in a format corresponding to video display device 104. Processed video signal 112 can be a composite video signal, s-video signal, component video signal, high-definition multimedia interface (HDMI) signal, video graphics array (VGA) signal or other signal in either analog or digital format. While shown as a separate device, receiving module can be included as a portion of video processing device 125.

In an embodiment of the present invention, the received signal 98 is a broadcast video signal, such as a television signal, high definition television signal, enhanced high definition television signal or other digital video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include a digital video signal that has been encoded in accordance with a digital video codec standard such as H.264, MPEG-4 Part 10 Advanced Video Coding (AVC) or other digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Video display devices 104 can include a television, monitor, computer, handheld device or other video display device that creates an optical image stream either directly or indirectly, such as by projection, based on decoding the video signal 110 either as a streaming video signal or by playback of a stored digital video file. It is noted that the present invention can also be implemented by transcoding a video stream and storing it or decoding a video stream and storing it, for example, for later playback on a video display device.

Video encoder/decoder 102 includes a control circuit that operates in accordance with the present invention and, in particular, includes many optional functions and features described in conjunction with FIGS. 5-24 that follow.

FIG. 5 presents a block diagram representation of a video encoder/decoder 102 in accordance with an embodiment of the present invention. Video encoder/decoder 102 can be a video codec that operates in accordance with many of the functions and features of the H.264 standard, the MPEG-4 standard, VC-1 (SMPTE standard 421M) or other standard, to generate processed video signal 112 by encoding, decoding or transcoding video input signal 110. Video input signal 110 is optionally formatted by signal interface 198 for encoding, decoding or transcoding by video encoder/decoder 102. In particular, video encoder/decoder 102 includes an entropy decoding module used in implementing entropy coding/reorder module 216.

The video encoder/decoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module 200 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 221, to the signal interface 198 and a plurality of other modules, such as motion search module 204, motion refinement module 206, direct mode module 208, intra-prediction module 210, mode decision module 212, reconstruction module 214, entropy coding/reorder module 216, forward transform and quantization module 220 and deblocking filter module 222. The modules of video encoder/decoder 102 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional buses can likewise be implemented in accordance with the present invention.

Video encoder/decoder 102 can operate in various modes of operation that include an encoding mode and a decoding mode that is set by the value of a mode selection signal that may be a user defined parameter, user input, register value, memory value or other signal. In addition, in video encoder/decoder 102, the particular standard used by the encoding or decoding mode to encode or decode the input signal can be determined by a standard selection signal that also may be a user defined parameter, user input, register value, memory value or other signal. In an embodiment of the present invention, the operation of the encoding mode utilizes a plurality of modules that each perform a specific encoding function. The operation of decoding can also utilizes at least one of these plurality of modules to perform a similar function in decoding. In this fashion, modules such as the motion refinement module 206, direct mode module 208, and intra-prediction module 210, mode decision module 212, reconstruction module 214, transformation and quantization module 220, and deblocking filter module 222, can be used in both the encoding and decoding process to save on architectural real estate when video encoder/decoder 102 is implemented on an integrated circuit or to achieve other efficiencies.

While not expressly shown, video encoder/decoder 102 can include a comb filter or other video filter, and/or other module to support the encoding of video input signal 110 into processed video signal 112.

Further details of specific encoding and decoding processes that use these function specific modules will be described in greater detail in conjunction with FIGS. 6 and 7.

FIG. 6 presents a block flow diagram of a video encoding operation in accordance with an embodiment of the present invention. In particular, an example video encoding operation is shown that uses many of the function specific modules described in conjunction with FIG. 5 to implement a similar encoding operation. Motion search module 204 generates a motion search motion vector for each macroblock of a plurality of macroblocks based on a current frame/field 260 and one or more reference frames/fields 262. Motion refinement module 206 generates a refined motion vector for each macroblock of the plurality of macroblocks, based on the motion search motion vector. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual pixel values corresponding to the final motion vector for each macroblock of the plurality of macroblocks by subtraction from the pixel values of the current frame/field 260 by difference circuit 282 and generates unfiltered reconstructed frames/fields by re-adding residual pixel values (processed through transform and quantization module 220) using adding circuit 284. The transform and quantization module 220 transforms and quantizes the residual pixel values in transform module 270 and quantization module 272 and re-forms residual pixel values by inverse transforming and dequantization in inverse transform module 276 and dequantization module 274. In addition, the quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed frames/fields 264 from the unfiltered reconstructed frames/fields. While a deblocking filter is shown, other filter modules such as comb filters or other filter configurations can likewise be used within the broad scope of the present invention. It should also be noted that current reconstructed frames/fields 264 can be buffered to generate reference frames/fields 262 for future current frames/fields 260.

As discussed in conjunction with FIG. 5, one or more of the modules described herein can also be used in the decoding process as will be described further in conjunction with FIG. 7.

Figure 7:
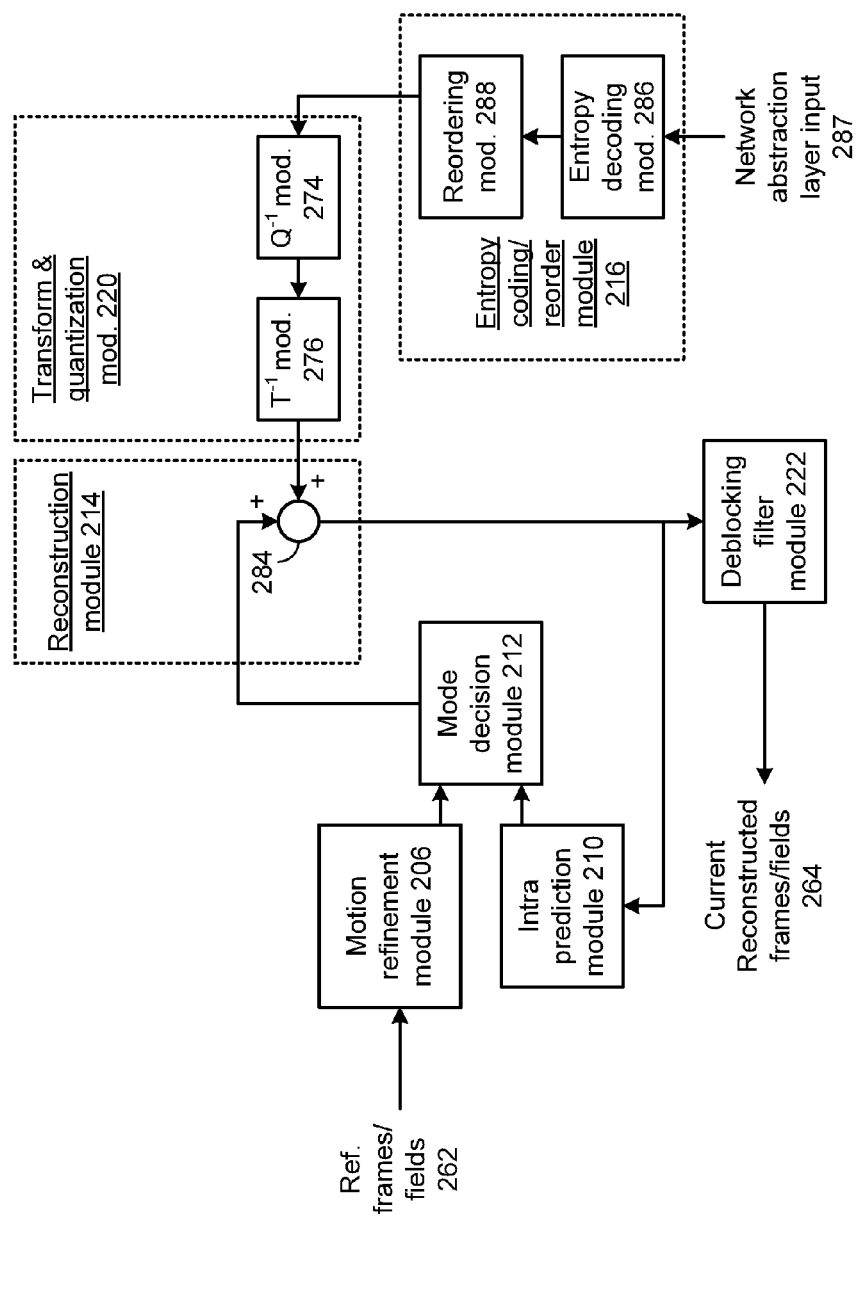
FIG. 7 presents a block flow diagram of a video decoding operation in accordance with an embodiment of the present invention.

FIG. 7 presents a block flow diagram of a video decoding operation in accordance with an embodiment of the present invention. In particular, this video decoding operation contains many common elements described in conjunction with FIG. 6 that are referred to by common reference numerals. In this case, the motion refinement module 206, the intra-prediction module 210, the mode decision module 212, and the deblocking filter module 222 are each used to process reference frames/fields 262. In addition, the reconstruction module 214 reuses the adding circuit 284 and the transform and quantization module reuses the inverse transform module 276 and the inverse quantization module 274. In should be noted that while entropy coding/reorder module 216 is reused, instead of reordering module 278 and entropy encoding module 280 producing the network abstraction layer output 281, network abstraction layer input 287 is processed by entropy decoding module 286, and reordering module 288.

While the reuse of modules, such as particular function specific hardware engines, has been described in conjunction with the specific encoding and decoding operations of FIGS. 6 and 7, the present invention can likewise be similarly employed to the other embodiments of the present invention and/or with other function specific modules used in conjunction with video encoding and/or decoding.

Figure 8:
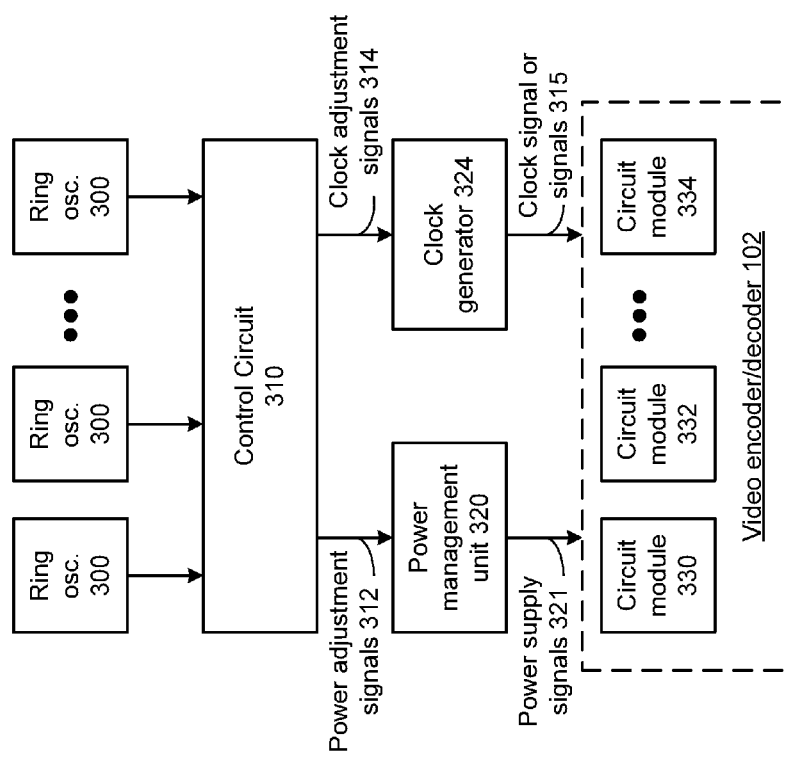
FIG. 8 presents a block diagram representation of a control circuit 310 in accordance with an embodiment of the present invention.

FIG. 8 presents a block diagram representation of a control circuit 310 in accordance with an embodiment of the present invention. In particular, a control circuit is shown for use in conjunction with a video encoder/decoder 102 implemented via an integrated circuit. The plurality of circuit modules (330, 332, 334, . . .) of the video encoder/decoder 102 that include hardware supported by a substrate to implement signal interface 198, processing module 200, memory module 202, and additional hardware to implement one or more of the following: motion search module 204, motion refinement module 206, direct mode module 208, intra-prediction module 210, mode decision module 212, reconstruction module 214, entropy coding/reorder module 216, forward transform and quantization module 220 and deblocking filter module 222.

A plurality of ring oscillators 300 generate a corresponding plurality of ring oscillator outputs. A control circuit 310 generates power adjustment signals 312 for an on-chip or off-chip power management unit 320 for adjusting at least one power supply voltage of the power supply signals 321 that power the circuit modules 330, 332, 334, . . . . In an embodiment, the ring oscillators are distributed among different location of the integrated circuit and are used to generate feedback on the local power conditions at these locations. The control circuit 310 analyzes the outputs from the ring oscillators 300 and generates the power adjustment signals 312 to control the power supplies such as the respective power supply voltages to these different locations to desired values.

The control circuit 310 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Such a memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the control circuit 310 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While shown as being separate from the circuit modules 330, 332 and 334, the control circuit 310 can be implemented in conjunction with one or more of these circuit modules. In an embodiment, control circuit 310 is implemented as one of the functions of processing module 200.

In addition, the control circuit 310 further generates at least one clock adjustment signal 314 for adjusting the frequency of an on-chip of off-chip clock generator 324 such as a clock circuit, frequency synthesizer, phase-locked loop or other clock circuit capable of frequency adjustment. In this fashion, one or more clocks used by the circuit modules (330, 332, 334, . . .) can be controlled to a desired frequency. It should be noted that clock generator 324 can be implemented via one of the ring oscillators 300.

In an embodiment, the power management unit 320 sets the voltages of the power supply signals 321 based on voltage data stored in at least one register of the power management unit 320. In a similar fashion, the clock generator 324 sets the frequency of one or more clock signals 315 based on frequency data stored in at least one register of the clock generator 324. The control circuit 310 implements adjustments to the power supply voltages and clock frequencies based on the power adjustment signals 312 and clock adjustment signals 314 that set the corresponding register values of power management unit 320 and the clock generator 324.

Further details regarding the operation of ring oscillators 300 and control circuit 310, including several optional functions and features are presented in conjunction with FIGS. 9-12 that follow.

Figure 9:
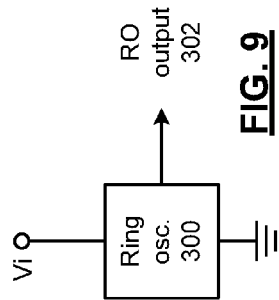
FIG. 9 presents a block diagram representation of a ring oscillator 300 in accordance with an embodiment of the present invention.

FIG. 9 presents a block diagram representation of a ring oscillator 300 in accordance with an embodiment of the present invention. In particular, ring oscillator 300 is shown that operates based on a particular power supply signal having voltage Vi, such as one of the power supply signals 321. The ring oscillator 300 generates a ring oscillator output 302 at a particular frequency that is dependent on the applied voltage Vi and die temperature T. In particular, changes in the local voltage Vi and temperature T cause changes in the frequency of ring oscillator output 302 that can be used as feedback for control circuit 310.

Figure 10:
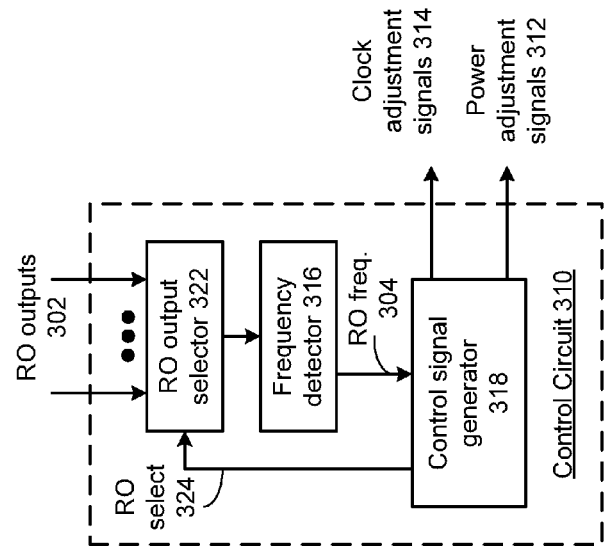
FIG. 10 presents a block diagram representation of a control circuit 310 in accordance with an embodiment of the present invention.

FIG. 10 presents a block diagram representation of a control circuit 310 in accordance with an embodiment of the present invention. In particular, control circuit 310 includes a ring oscillator output selector 322, such as a multiplexer, switch or other selector generates a selected ring oscillator output from the plurality of ring oscillator outputs 302 based on a ring oscillator selection 327. A frequency detector 317, such as a frequency counter or other frequency detector generates a ring oscillator frequency 304 based on the selected ring oscillator output. A control signal generator 318 such as a processing device or other control signal generator generates the ring oscillator selection 327 to scan the plurality of ring oscillator outputs 302. In one example of operation, the control signal generator 318 generates and the power adjustment signals 312 to adjust the power supply voltage on a location by location basis, based on the selected ring oscillator output 302. Feedback from a ring oscillator 300 in a particular region of the video processing device is used to adjust the local voltage supplied to that region to a desired level, such as to compensate for temperature, line loses and particular device characteristics. In addition, as discussed in conjunction with FIG. 8, control signal generator 318 can generate one or more clock adjustment signals 314 to provide clock frequency adjustments either globally or on a location by location basis.

Figure 11:
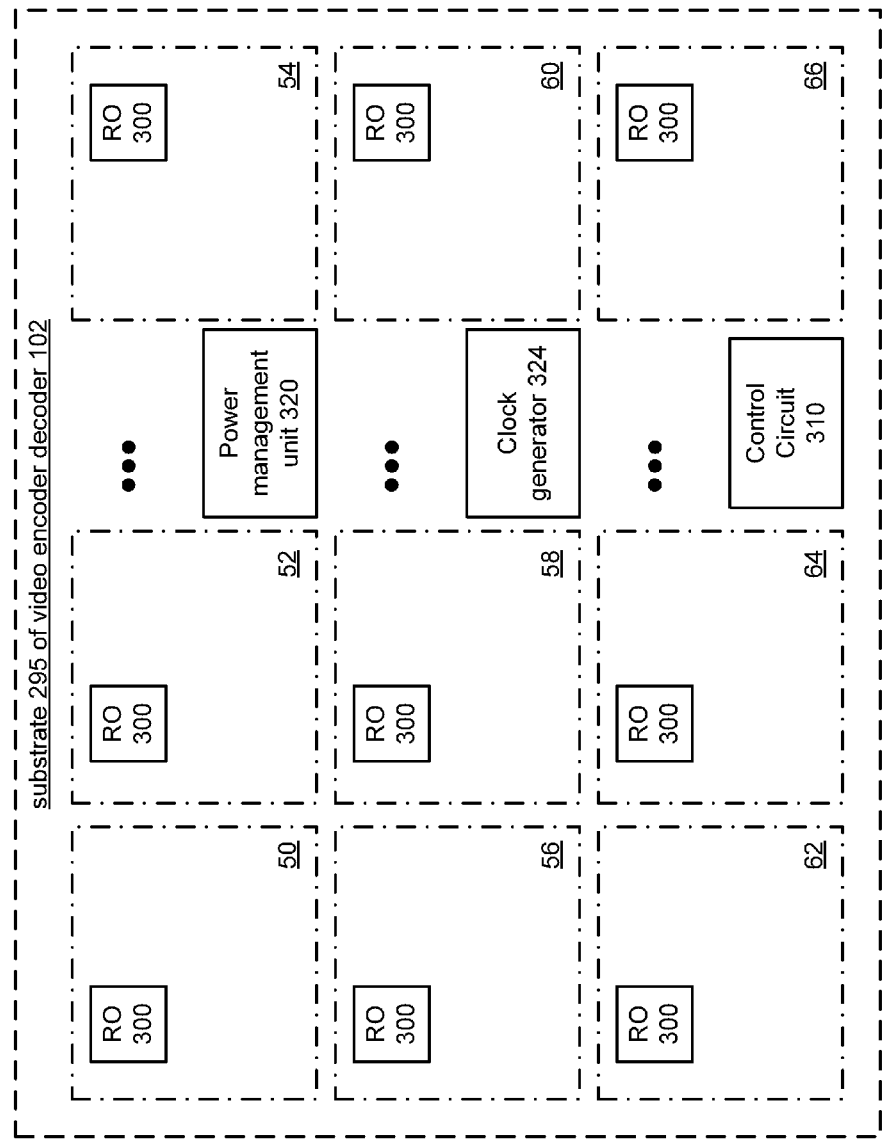
FIG. 11 presents a block diagram representation of an integrated circuit in accordance with an embodiment of the present invention.

FIG. 11 presents a block diagram representation of an integrated circuit in accordance with an embodiment of the present invention. In particular, an integrated circuit is presented, such as a video processing integrated circuit that implements video encoder/decoder 102. The integrated circuit includes a supporting substrate 295 that supports a plurality of circuit modules of the video encoder decoder 102 that include hardware to implement signal interface 198, processing module 200, memory module 202, and additional hardware to implement one or more of the following: motion search module 204, motion refinement module 206, direct mode module 208, intra-prediction module 210, mode decision module 212, reconstruction module 214, entropy coding/reorder module 216, forward transform and quantization module 220 and deblocking filter module 222 and are located among different regions 50, 52, 54, 56, 58, 60, 62, 64 and 66 of the chip. In additional to these functional blocks, a plurality of ring oscillators 300 are also supported by the substrate 295 and are located among the different regions 50, 52, 54, 56, 58, 60, 62, 64 and 66.

As previously discussed, the plurality of ring oscillators 300 generate a corresponding plurality of ring oscillator outputs 302. Control circuit 310 generates power adjustment signals for adjusting the power supply voltages of the video processing device, based on the plurality of oscillator outputs for the different regions 50, 52, 54, 56, 58, 60, 62, 64 and 66 of the chip. The plurality of power supply voltages corresponding to the different regions on the substrate are adjusted via the power management unit 320. In addition, the control circuit 310 and the clock generator 324 also adjust one or more clock frequency of the clock signals supplied to the circuit modules of video encoder/decoder 102, based on feedback from the ring oscillators 300.

Figure 12:
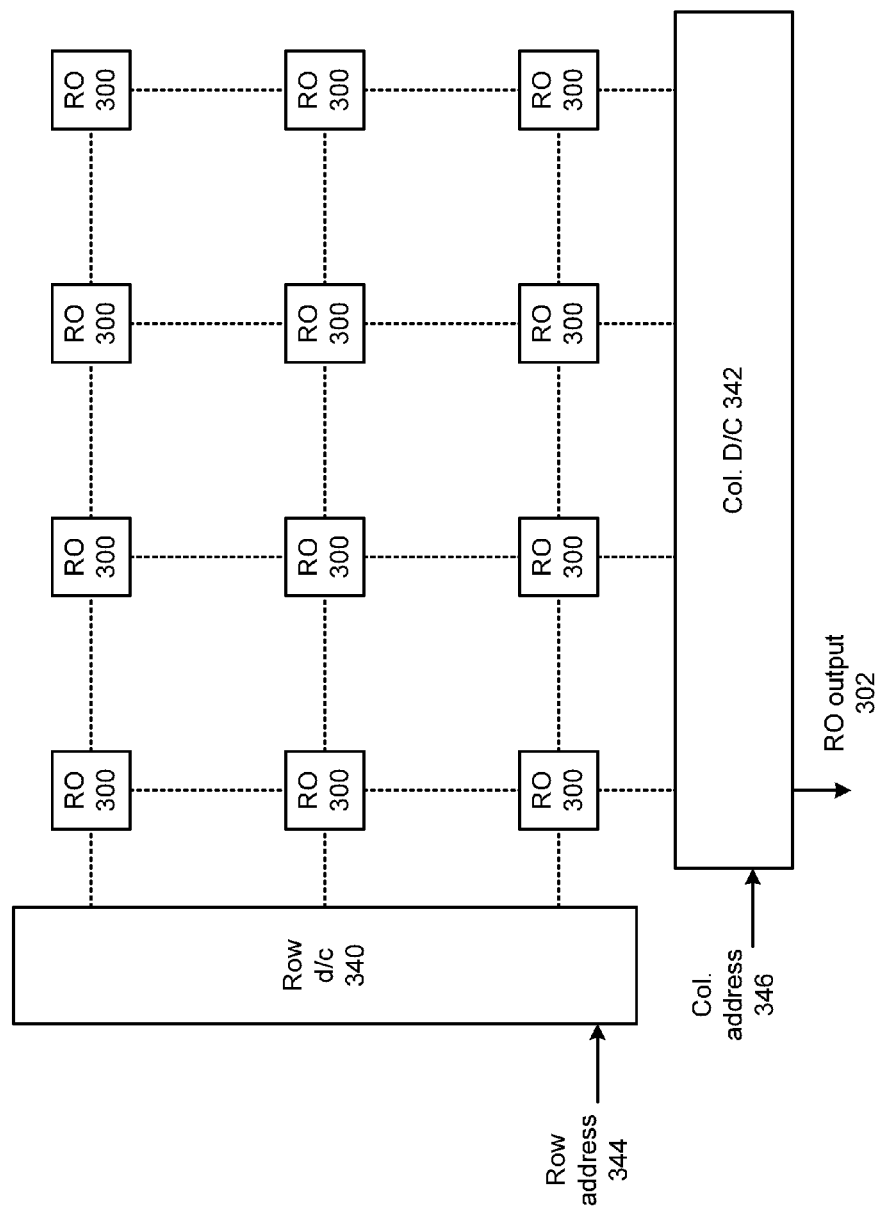
FIG. 12 presents a block diagram representation of a ring oscillator matrix in accordance with an embodiment of the present invention.

FIG. 12 presents a block diagram representation of a ring oscillator matrix in accordance with an embodiment of the present invention. In this embodiment, the plurality of ring oscillators 300 are distributed along a plurality of rows and columns of the substrate 295. In this configuration the ring oscillator output selector 322 is implemented via a column decoder 342 and a row decoder 341 to couple selected ones of the plurality of ring oscillator outputs 302 to the control circuit 310 in response to a row address 344 and column address 346 included in ring oscillator selection 327.

In accordance with this example, the row decoder 341 provides a switch that selectively couples a power supply to power each of the ring oscillators 300 in a particular row of the matrix corresponding to the row address 344. The column decoder 342 includes a switch that couples the ring oscillator output 302 of the particular ring oscillator 300 in the column of the matrix corresponding column address 346.

Figure 13:
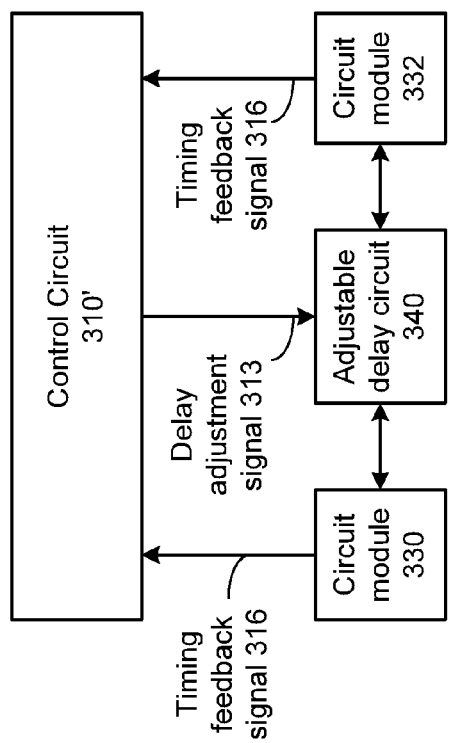
FIG. 13 presents a block diagram representation of a control circuit 310' in accordance with an embodiment of the present invention.

FIG. 13 presents a block diagram representation of a control circuit 310' in accordance with an embodiment of the present invention. As previously discussed, the circuit modules 330 and 332 are hardware modules of a video processing device such as encoder/decoder 102 that cooperate to process an input video signal into a processed video signal, either alone or via the use of other modules of encoder/decoder 102. The control circuit 310' generates a delay adjustment signal 313 in response to a delay calibration of the plurality of circuit modules 330 and 332. The adjustable delay circuit 340 couples a signal from one of the circuit modules (330, 332) to the other circuit module with a delay that is set based on the delay adjustment signal 324. The adjustable delay circuit 340 can be implemented via a tapped delay line, series connection of selectively engaged and disengaged discrete delay circuits or other adjustable delay circuit.

The control circuit 310' can be implemented as a stand-alone unit or be implemented in a similar fashion to and include the function and features of control circuit 310. In operation, the control circuit gathers timing feedback signals 316 from one or more of the circuit modules 330, and 332 in conjunction with the delay calibration. For example, the control circuit 310' can provide a delay adjustment signal 313 to iteratively adjust the delay of adjustable delay circuit 340 during a calibration procedure that includes either a test routine or actual operation of the video processing device. Control circuit 310' set the delay of adjustable delay circuit 340 to the adjusted delay value that provides the best performance, optimal performance or acceptable performance of the circuit modules 330, 332 based on the results reflected by the timing feedback signals 316 during the test routine or actual operation.

Figure 14:
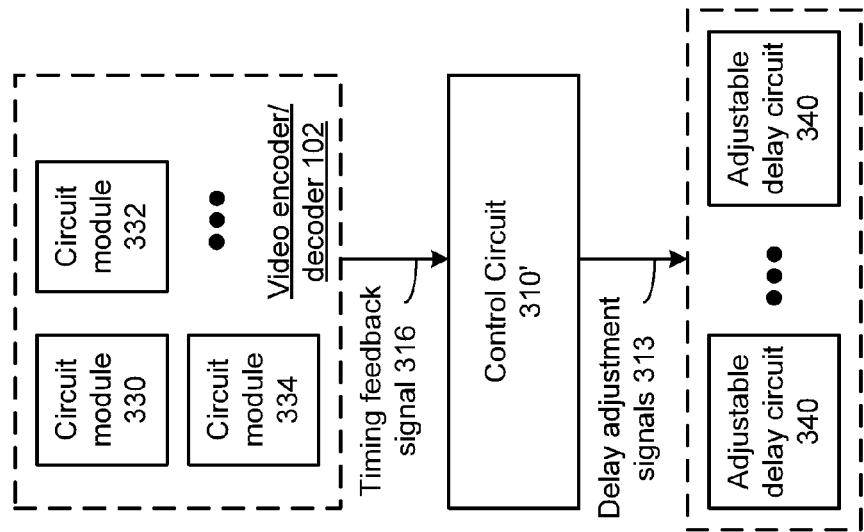
FIG. 14 presents a block diagram representation of a control circuit 310' in accordance with an embodiment of the present invention.

FIG. 14 presents a block diagram representation of a control circuit 310' in accordance with an embodiment of the present invention. While the system described in conjunction with FIG. 13 operates to implement a single delay between a pair of circuit modules 330 and 332, in this embodiment the control circuit 310' sets adjustable delays for a plurality of adjustable delay circuits 340 that couple additional circuit modules (330, 332, 334, . . . ) of the video encoder/decoder 102. In this fashion, adjustable delay circuits 340 can provide coupling between multiple circuit modules (330, 332, 334, . . . ) on a pairwise basis, on a one to many basis, on a many to one basis or in other circuit configurations.

Control circuit 310' sets the delay of adjustable delay circuits 340 to the adjusted delay values that provide the best performance, optimal performance or acceptable performance of the circuit modules (330, 332, 334, . . . ) based on the results reflected by the timing feedback signals 316 during the test routine or actual operation. In an embodiment, the adjustable delay circuits 340 set the delay based on delay data stored in one or more registers. The control circuit 310' implements adjustments to the delays based on the power adjustment signals 312 and clock adjustment signals 313 that set the corresponding register values of adjustable delay circuits 340.

Figure 15:
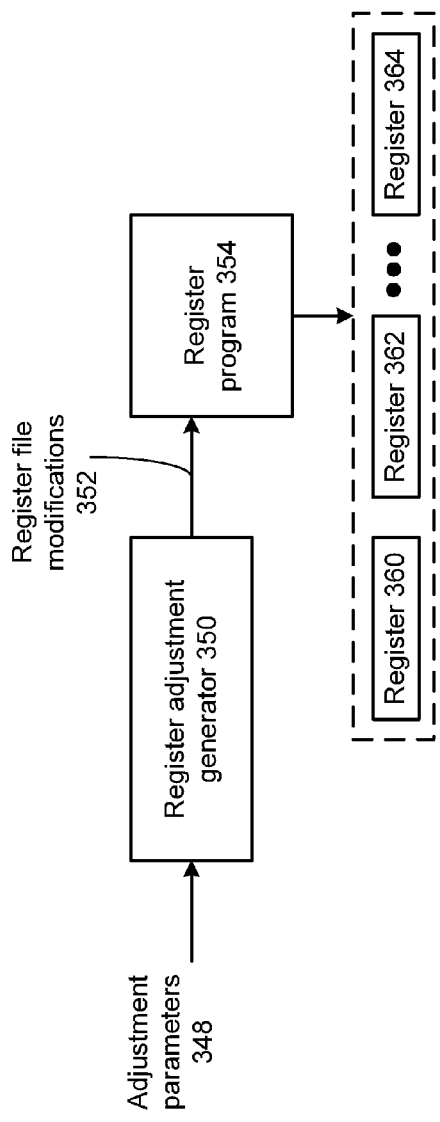
FIG. 15 presents a block diagram representation of a register adjustment generator 350 in accordance with an embodiment of the present invention.

FIG. 15 presents a block diagram representation of a register adjustment generator 350 in accordance with an embodiment of the present invention. In particular, a register adjustment generator is presented for use in conjunction with a control circuit 310 or 310' or similar device. In this example, registers (360, 362, 364 . . . ) correspond to the power management unit 320, clock generator 324, adjustable delay circuit 340 or other circuits that are adjusted in conjunction with a set-up or other calibration of a circuit such as video processing device 125. These registered are configured based on register program 354 such as a Verilog program or other register control language.

A plurality of adjustment parameters 348, such as power adjustment signals 312, delay adjustment signals 313 clock adjustment signals 314 or other hardware adjustment parameters are input to the register adjustment generator 352 to generate register file modifications 352. In operation, the register adjustment generator 350 includes a compiler or other software module or device that generates new or modified register program code, such as Verilog register program code, as the register file modifications 352. When executed, the register program 354 configures or otherwise sets the registers (360, 362, 364, . . . ) to implement the adjustments indicated by adjustment parameters 348.

Figure 16:
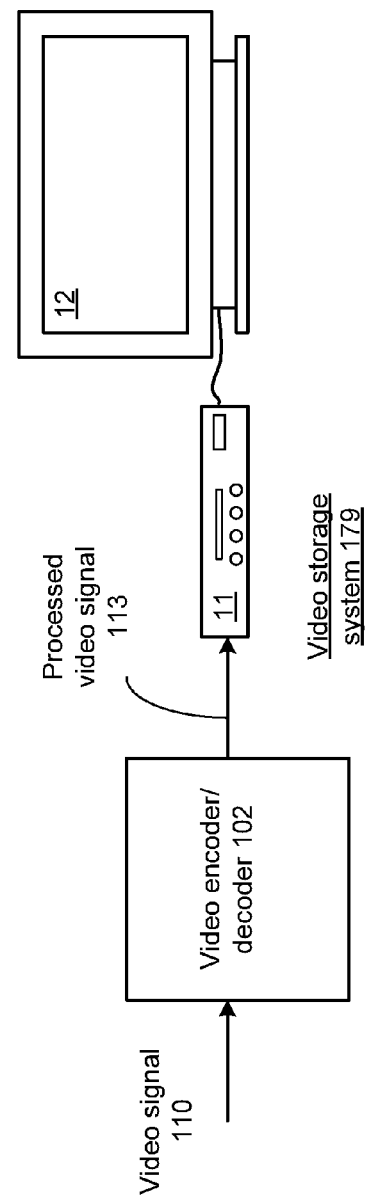
FIG. 16 presents a block diagram representation of a video storage system 179 in accordance with an embodiment of the present invention.

FIG. 16 presents a block diagram representation of a video storage system 179 in accordance with an embodiment of the present invention. In particular, device 11 is a set top box with built-in digital video recorder functionality, a stand alone digital video recorder, a DVD recorder/player or other device that stores a processed video signal 113 for display on video display device such as television 12. While video encoder/decoder 102 is shown as a separate device, it can further be incorporated into device 11. In this configuration, video encoder/decoder 102 can further operate to decode the processed video signal 113 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 113 in accordance with the methods and systems described in conjunction with the features and functions of the present invention as described herein.

Figure 17:
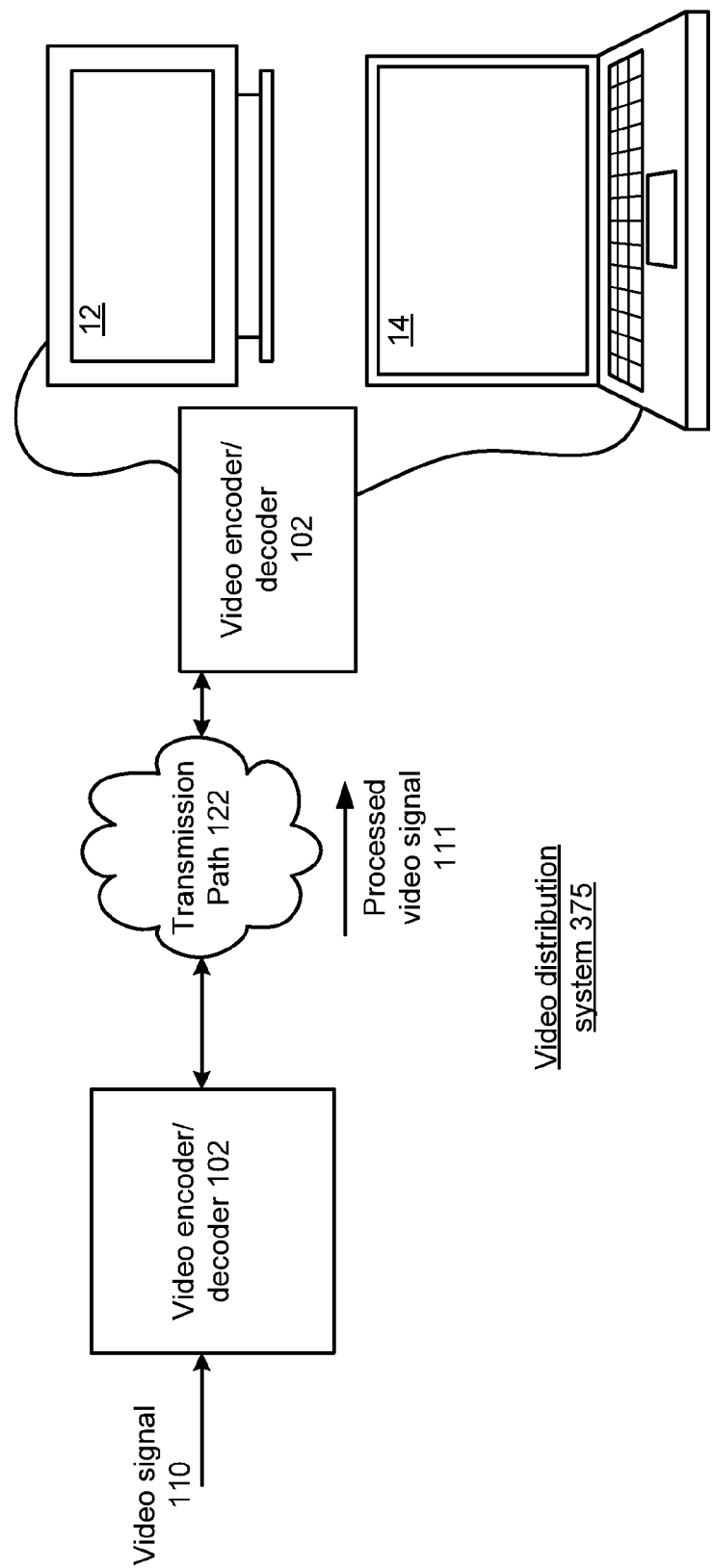
FIG. 17 presents a block diagram representation of a video distribution system 375 in accordance with an embodiment of the present invention.

FIG. 17 presents a block diagram representation of a video distribution system 375 in accordance with an embodiment of the present invention. In particular, a processed video signal 111, created by encoding or transcoding a video signal 110, is transmitted from a first video encoder/decoder 102 via a transmission path 122 to a second video encoder/decoder 102 that operates as a decoder. The second video encoder/decoder 102 operates to decode the processed video signal 111 for display on a display device such as television 12, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

FIG. 18 presents a flowchart representation of a method in accordance with an embodiment of the present invention. In particular, a method is presented for use in conjunction with one or more functions and features described in conjunction with FIGS. 1-17. In step 400, a plurality of ring oscillator outputs are generated via a corresponding plurality of ring oscillators coupled to the substrate. In step 402, the plurality of ring oscillator outputs are monitored. In step 404, power adjustment signals are generated via a control circuit, for adjusting at least one power supply voltage of the video processing device, based on the plurality of ring oscillator outputs.

In an embodiment, step 404 includes generating a ring oscillator selection; generating a selected ring oscillator output from the plurality of ring oscillator outputs based on the ring oscillator selection; generating a ring oscillator frequency based on the selected ring oscillator output; and generating the power adjustment signals, based on the selected ring oscillator output. Step 400 can include scanning the plurality of ring oscillator outputs. The plurality of ring oscillators can be distributed along a plurality of rows and columns of the substrate, and the ring oscillator selection includes a row and column address.

FIG. 19 presents a flowchart representation of a method in accordance with an embodiment of the present invention. In particular, a method is presented for use in conjunction with one or more functions and features described in conjunction with FIGS. 1-18. In step 410, the plurality of power supply voltages corresponding to at least two of the plurality of different locations on the substrate are adjusted, based on the power adjustment signals.

FIG. 20 presents a flowchart representation of a method in accordance with an embodiment of the present invention. In particular, a method is presented for use in conjunction with one or more functions and features described in conjunction with FIGS. 1-19. In step 420, at least one clock adjustment signal is generated for adjusting the frequency of a clock generator.

FIG. 21 presents a flowchart representation of a method in accordance with an embodiment of the present invention. In particular, a method is presented for use in conjunction with one or more functions and features described in conjunction with FIGS. 1-20. In step 430, an input video signal is cooperatively processed into a processed video signal via a plurality of circuit modules. A delay adjustment signal is generated in response to a delay calibration of the plurality of circuit modules via a control circuit. A signal from a first circuit module of a plurality of circuit modules is coupled, via an adjustable delay circuit, to a second circuit module of the plurality of circuit modules with a delay that is set based on the delay adjustment signal.

In an embodiment, the delay is set by generating a register file modification based on the delay adjustment signal corresponding to at least one register, and setting the delay based on delay data stored in the at least one register. The plurality of circuit modules cooperate to process the input video signal by at least one of: a decoding of the input video signal, a encoding of the processed video signal, and a transcoding of the processed video signal.

FIG. 22 presents a flowchart representation of a method in accordance with an embodiment of the present invention. In particular, a method is presented for use in conjunction with one or more functions and features described in conjunction with FIGS. 1-21. In step 440, timing feedback signals are gathered from at least one of: the first circuit module and the second circuit module in conjunction with the delay calibration. Step 430 can be further based on the timing feedback signals.

FIG. 23 presents a flowchart representation of a method in accordance with an embodiment of the present invention. In particular, a method is presented for use in conjunction with one or more functions and features described in conjunction with FIGS. 1-22. In step 450, a plurality of circuit modules cooperatively process an input video signal into a processed video signal. In step 452, a plurality of adjustment parameters are generated in response to a calibration of the plurality of circuit modules. In step 454, a register file modification is generated based on the plurality of adjustment parameters.

FIG. 24 presents a flowchart representation of a method in accordance with an embodiment of the present invention. In particular, a method is presented for use in conjunction with one or more functions and features described in conjunction with FIGS. 1-23. In step 460, a plurality of registers are set based on the register file modifications. In step 462, at least one power supply voltage is set based on contents of at least one of the plurality of registers. In step 464, at least clock frequency is set based on contents of at least one of the plurality of registers. In step 466, a time delay is set based on contents of at least one of the plurality of registers.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A video processing device comprising:
   a substrate;
   a plurality of ring oscillators coupled to the substrate, the plurality of ring oscillators generating a corresponding plurality of ring oscillator outputs, wherein the plurality of ring oscillators are distributed along a plurality of rows and columns of the substrate;
   a control circuit, coupled to monitor the plurality of ring oscillator outputs, that generates power adjustment signals for adjusting at least one power supply voltage of the video processing device, based on the plurality of ring oscillator outputs; and
   a column decoder and a row decoder, coupled to the control circuit and the plurality of ring oscillators, that couple a selected one of the plurality of ring oscillator outputs to the control circuit in response to a row and column address.

2. The video processing device of claim 1 wherein the at least one power supply generates a plurality of power supply voltages and the plurality of ring oscillators are distributed at different locations on the substrate, and wherein the control circuit generates the power adjustment signals to adjust the plurality of power supply voltages corresponding to at least two of the different locations on the substrate.

3. The video processing device of claim 1 wherein the control circuit includes:
   a ring oscillator output selector that generates a selected ring oscillator output from one of the plurality of ring oscillators corresponding to a row and column of the substrate based on a ring oscillator selection that includes the row and column address corresponding to the row and column of the substrate;
   a frequency detector, coupled to the ring oscillator output selector, that generates a ring oscillator frequency based on the selected ring oscillator output; and
   a control signal generator, coupled to the frequency detector and the ring oscillator output selector, that generates the ring oscillator selection and the power adjustment signals, based on the selected ring oscillator output.

4. The video processing device of claim 3 wherein the control signal generator generates the ring oscillator selection to scan the plurality of ring oscillator outputs.

5. The video processing device of claim 1 wherein the control circuit further generates at least one clock adjustment signal for adjusting a frequency of a clock generator.

6. A method for use in a video processing device that includes a substrate, the method comprising:
   generating a plurality of ring oscillator outputs via a corresponding plurality of ring oscillators distributed along a plurality of rows and columns of the substrate;
   monitoring the plurality of ring oscillator outputs by selecting ones of the plurality of ring oscillator outputs in response to a row and column address; and
   generating power adjustment signals, via a control circuit, for adjusting at least one power supply voltage of the video processing device, based on the plurality of ring oscillator outputs.

7. The method of claim 6 wherein at least one power supply generates a plurality of power supply voltages and the plurality of ring oscillators are distributed at different locations on the substrate, and the method further comprises:
   adjusting the plurality of power supply voltages corresponding to at least two of the different locations on the substrate, based on the power adjustment signals.

8. The method of claim 6 wherein generating the power adjustment signals includes:
   generating a ring oscillator selection that includes the row and column address;
   generating a selected ring oscillator output from one of the plurality of ring oscillators at a row and column of the substrate that corresponds to the row and column address;
   generating a ring oscillator frequency based on the selected ring oscillator output; and
   generating the power adjustment signals, based on the selected ring oscillator output.

9. The method of claim 8 wherein generating the ring oscillator selection includes scanning the plurality of ring oscillator outputs.

10. The method of claim 6 further comprising:
    generating at least one clock adjustment signal for adjusting a frequency of a clock generator.

* * * * *